United States Patent [19]

Minicilli

[11] Patent Number: 4,567,592
[45] Date of Patent: Jan. 28, 1986

[54] METHOD AND APPARATUS FOR THE STEPWISE STATIC TESTING OF THE RESPECTIVE CONNECTIONS AND INTEGRATED SUBSYSTEMS OF A MICROPROCESSOR-BASED SYSTEM FOR USE BY THE GENERAL PUBLIC

[75] Inventor: Jean Minicilli, Torcy, France

[73] Assignee: U.S. Philips Corporation, New York, N.Y.

[21] Appl. No.: 528,378

[22] Filed: Sep. 1, 1983

[30] Foreign Application Priority Data

Sep. 8, 1982 [FR] France .................... 82 15235

[51] Int. Cl.⁴ .................... G01R 31/28; G06F 11/00
[52] U.S. Cl. .................... 371/20; 324/73 R; 371/16
[58] Field of Search .......... 324/73 R, 73 AT; 371/16, 17, 20; 364/900 MS File

[56] References Cited

U.S. PATENT DOCUMENTS 4,192,451 3/1980 Swerling et al. ............... 324/73 R
4,231,087 10/1980 Hunsberger et al. ............ 371/16 X
4,334,308 6/1982 Thinschmidt et al. ........... 371/17 X
4,370,728 1/1983 Coffron .................. 364/900
4,455,654 6/1984 Bhaskar et al. ............... 371/20
4,484,329 11/1984 Slamka et al. ................ 371/20 X

OTHER PUBLICATIONS

Corso, A Test Technique for Microprocessor Based Machines, 2/79, Alta Frequenza, vol. 48, pp. 23E-63-2-7E-67.

Primary Examiner—Charles E. Atkinson
Attorney, Agent, or Firm—Jack E. Haken; James J. Cannon, Jr.

[57] ABSTRACT

A testing device replaces the microprocessor of the microcomputer in order to generate manually and statically binary signals for the activation of the various circuits; the signals transmitted and received, notably on the bus, are displayed by means of light-emitting diodes. The test method consists of the generation and display by means of the device of specific signals in order to facilitate fault-finding in a defective apparatus.

6 Claims, 4 Drawing Figures

METHOD AND APPARATUS FOR THE STEPWISE STATIC TESTING OF THE RESPECTIVE CONNECTIONS AND INTEGRATED SUBSYSTEMS OF A MICROPROCESSOR-BASED SYSTEM FOR USE BY THE GENERAL PUBLIC

BACKGROUND OF THE INVENTION

The present invention relates to a method and apparatus for the stepwise static testing of the respective connections and integrated subsystems of a microprocessor-based system.

Devices for testing microprocessors have been referenced, for example in "Computer Design", March 1979, page 160 and further, "Troubleshooting Microprocessors With a Logic Analyzer System", and "L'électronique Industrielle", No. 25, dated 1.12.81, page 41 and further, "L'analyse de signature pour la maintenance sur le site". Repair devices are being manufactured by FLUKE, 606 Rue Fourny, ZI Centre, BP.31, 78530 BUC, France. However these publications and devices are intended for the development and testing of microprocessors and their peripheral integrated circuits, but not their connections; furthermore, these various devices are intended for use by experts for providing specific maintenance for high-level professional products; such products to be used by electronic data processing experts are expensive and comparatively complicated to operate. On the other hand, distributors and repair technicians for microprocessor-based systems that are in fact mass products, such as small domestic appliances and video-games often are not skilled in the art of data processing but are used to the problems occurring in reparing products like conventional television sets for which voltmeters and analog oscilloscopes are suitable tools. However, the latter are quite inadequate for use with digital systems. The difficulty in testing connections are circuits with these well known tools for the origin of a fault stems from the fact that characterizing signals during operation of a digital system are transitory and non-recurrent; on the other hand, the circuits are very vulnerable for overvoltages which could be produced during conventional electronic tests, which would thus itself cause (further) breakdowns.

Adequate testing would require digital means, such as a storage oscilloscope, but this would represent and overly large investment for repairing small and/or inexpensive mass-products. Furthermore, the operation of such means would be complicated and often advance knowledge of the operation of system would be required.

It is an object of the invention to provide an inexpensive, simple to operate, and static method and apparatus for the static testing of respective connections and integrated subsystems of a microprocessor-based system for use by the general public.

SUMMARY OF THE INVENTION

The object is realized by providing a method for testing a microprocessor-based system, said system having a data bus (BUSMUX) with a first plurality of bit lines in parallel, an address bus (ADBUS) with a second plurality of bit lines in parallel, and a third plurality of control bit lines for interconnecting said microprocessor ($\mu$P) with respective peripheral circuits (ROM, RAM) thereof, said method comprising the steps of:

(a) verification of correct operation of a general power supply means for said system;
(b) verification of correct operation of a clock signal procurement means for said system;
(c) replacement of the microprocessor by another microprocessor of the same type in order to determine whether or not the microprocessor itself is defective; said method being characterized in that it comprises the following steps;
(d) removing the non-defective microprocessor while steering all said peripheral circuits to respective high-impedance output states with respect to associated ones of said first, second, and third pluralities of bit lines;
(e) feeding said first, second and third pluralities of bit lines with a sequence of quasi-static signal patterns for implementing the following steps for testing a predetermined peripheral circuit interconnection;
(f) applying a sequence of binary signals to each bit line associated to said peripheral circuit and verifying the presence of said binary signal on the corresponding package input of said peripheral circuit;
(g) verifying of the absence of short circuits between the various bus lines and/or between a line and the power supply by applying a binary signal of high level via a single bus line and a binary signal of low level via all other bus lines, and verifying that said binary signal of high level does not arrive on a bus line other than the line on which it has been despatched, followed by the successive application of said binary high signal via all other bus lines in order to perform the same verification as before by simple permutation of signal values;
(h) verifying of the absence of short circuits between the various bus lines and/or between a line and ground by despatching a binary signal of low level (connected to ground) via a single bus line and a binary signal of high level via all other bus lines, and verifying that said binary signal of low level does not arrive on a bus line other than the line on which it has been despatched, followed by the successive application of said binary signal of low level on all other bus lines in order to perform the same verification as before by simple permutation of signal values. Among other things no risk is incurred for executing incorrect manipulations such as applying overvoltages.

A basic idea is to temporarily replace the microprocessor by a device which allows for the manual and simple generation of suitable binary signals instead of the microprocessor, and for verifying, by simple direct display on said device, that said binary signals indeed reach the peripheral integrated circuits and, as the case may be, indeed evoke the correct reaction correct by said peripheral integrated circuits.

BRIEF DESCRIPTION OF THE FIGURES

The implementation of the method and the simple operation of a device in accordance with the present invention will be better understood on the basis of the following description of an embodiment which is given by way of a preferred embodiment which describes a testing method and device for a video game. This will be explained further with respect to the following figures.

DESCRIPTION OF THE PREFERRED EMBODIMENT

The video game to be tested is marketed by the Philips Group of Companies as the "Vidéo-jeu C52". The testing device to be described is dimensioned in accordance with this game, e.g. as regarding the eight-bit-wide multiplex bus of this video game. However, the invention could also be used with other bus widths, non-multiplexed bus or other architectural variations.

The microprocessor based video game in question furthermore comprises a read-only memory ROM, a random access memory RAM with a latch since the bus is multiplexed, and also peripheral integrated circuits which are controlled by said microprocessor, for example, a keyboard and two control boxes for the game players. Hereinafter, only the testing of the connections and the integrated circuits of the memories ROM and RAM will be described, it being understood that the other integrated circuits and their connections are tested in a similar manner with a simple transposition due to specific particularities (connections and/or gates used) of each respective peripheral integrated circuit.

BRIEF DESCRIPTION OF THE MICROPROCESSOR SYSTEM

Figure 1:
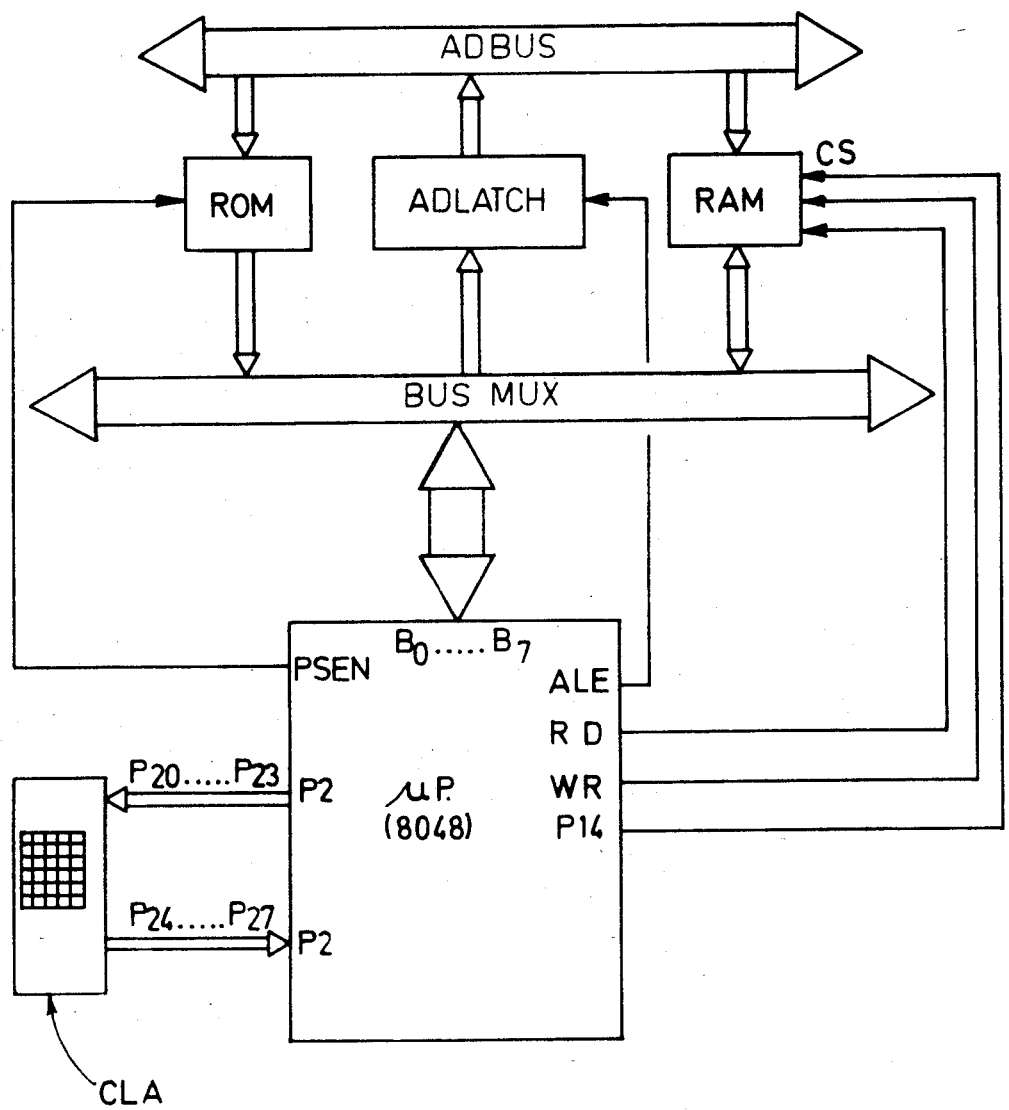
FIG. 1 is a concise representation of the video game system in question.

FIG. 1 shows the lay-out of the microprocessor system, which in this case has the following elements:
a microprocessor µP (Signetics 8048);
a program memory ROM which is in this case formed by a cartridge so that the game can be exchanged by replacement of the cartridge;
a random access memory (Signetics 6810) RAM;
a multiplexed bus BUSMUX;
an address latch ADLATCH (2x Signetics 74LS175);
an address bus (ADBUS)
a command keyboard CLA for the player (players) of the video game.

For the sake of simplicity, neither the two control boxes, e.g. for interfacing player operated joysticks to the microprocessor system via two buffers, nor the video processor interface between the microprocessor system and the television screen on which the game is displayed are shown, because these devices and circuits are in itself conventional.

The keyboard CLA, comprises keys and is connected to the microprocessor via the lines P20 to P23 and P24 to P27.

The eight-bit multiplexed bus BUSMUX is connected to the terminals B0 through B7 of the microprocessor.

The output PSEN (Program Storage Enable = read next instruction) is connected to the ROM.

The output ALE (Address Latch Enable) of the microprocessor is connected to the latch ADLATCH.

The output P14 of the microprocessor is connected to the terminal CS (Chip Select) of the RAM.

The terminals RD (READ) and WR (WRITE) are connected to the RAM.

The address bus ADBUS is connected to the latch (ADLATCH), to the RAM and to the ROM.

EXTENSIVE DISCLOSURE OF THE PREFERRED EMBODIMENT

Figure 2:
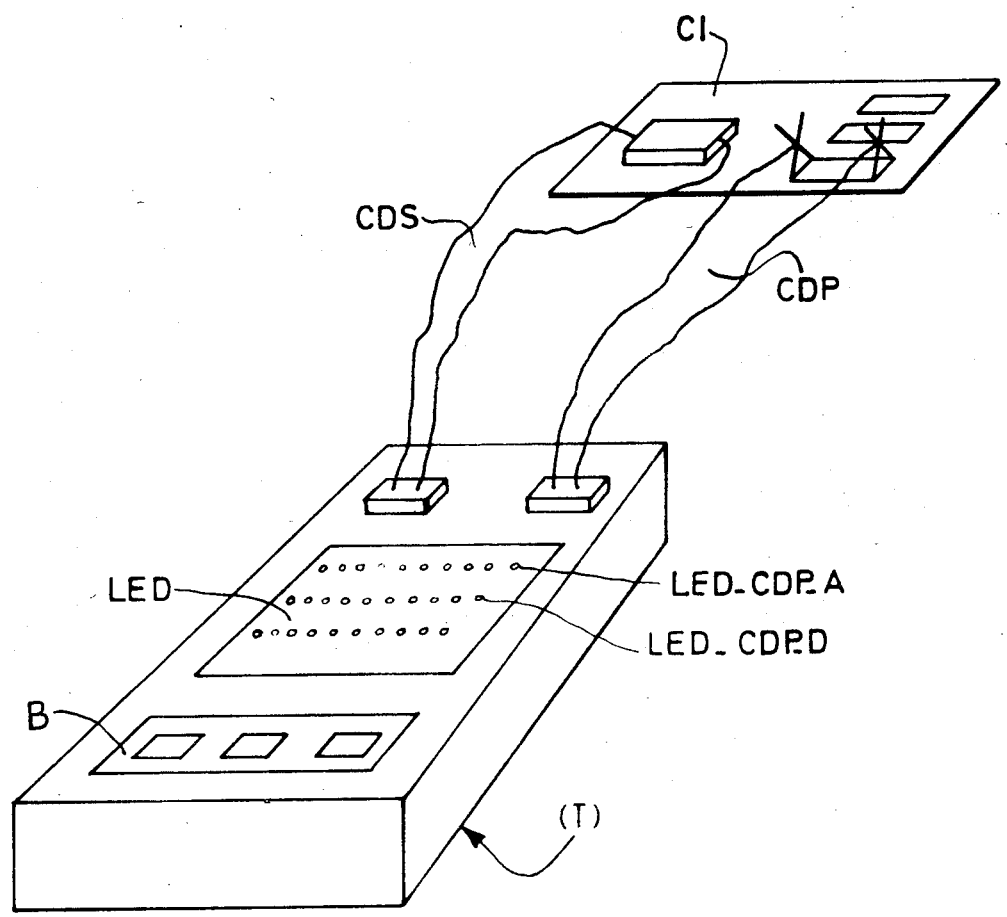
FIG. 2 is an external simplified view of the testing device adapted for the video game.

FIG. 2 is a concise representation of the testing device (T) with its connections to the microcomputer CI to be tested.

The testing device (T) is formed as a box which contains the electronic circuitry (described with reference to the FIGS. 3 and 4) and whose upper surface comprises several buttons (B) necessary for performing the method as well as several light-emitting diodes LED for the display of the static binary signals generated and received.

The connections to the microcomputer are:
a substitution connector (CDS) which comprises a 40-wire flat cable which is terminated by two 40-pin connectors, one connector being connected to the test box T while the other connector is connected to the microcomputer (CI) instead of the microprocessor. The cable has been shown symbolically and the two plugs as boxes only. It allows for bidirectional data transfer in lieu of the microprocessor.
a test connector (CDP) which comprises a 16-wire cable which is connected at one end to the test box T and at the other end, by way of a test probe, to the pads of a peripheral integrated circit (ROM, RAM or other) of the microcomputer. It allows the testing device to know which signals are present on the pads of the peripheral integrated circuit whereto it has been connected by way of the test probe.

The 16 signals received on the test connector CDP are directly displayed by 16 light-emitting diodes LED, 8 of which (LED-CDP-D) display the data while the other 8 (LED-CDP-A) display the addresses.

Figure 3:
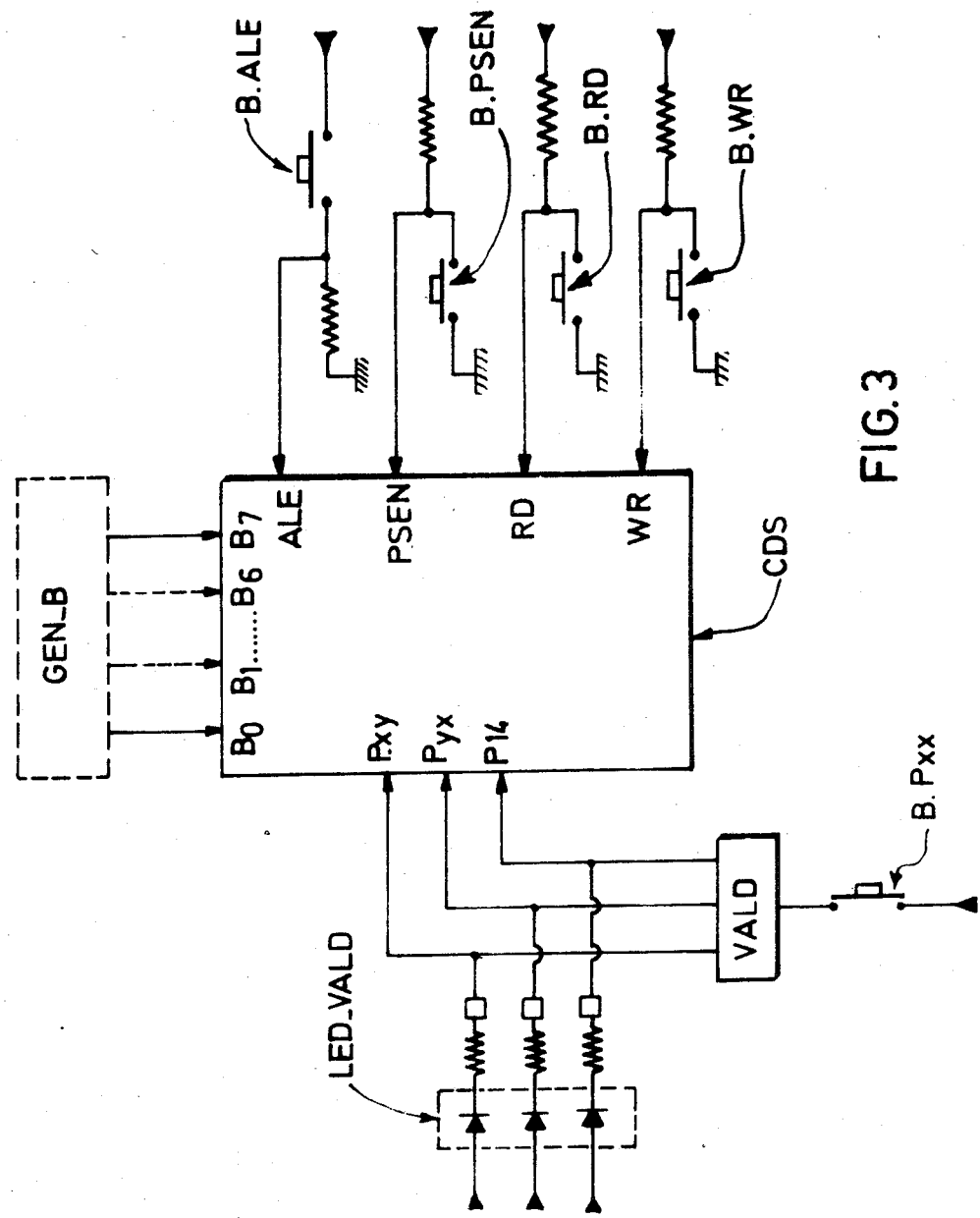
FIG. 3 shows the general electrical diagram of the testing device.

FIG. 3 shows the connection of the 40-pin connector (on the side of the testing device) of the connector CDS to the internal electronic circuitry of the testing box; only those pins have been shown that are necessary for a proper understanding. The specific electronic elements relating to the eight pins B0 through B7 of the multiplexed bus as symbolized by block GEN.B will be described in detail with reference to FIG. 4.

Push-button B.ALE activates pin ALE by means of a pulse of level "high". Push-button B.PSEN activates pin PSEN by means of a pulse of level "low". Likewise, pin RD is activated by push-button B.RD and pin WZ by push-button B.WR. The voltage levels are proper to the microprocessor 8048.

The connection P14 and other connections, for example, Pxy and Pyx are activated by the button B-Pxx by way of a box (VALD) which enables the activation of only one connection at a time. The connection P14 herein serves for the validation of the memory RAM which must be done in anticoincidence with respect to any other validation. The connection Pxy serves for validating the keyboard. The connection Pyx serves for the validation of the video processor.

Provided the box (VALD) imposes that only a single peripheral integrated circuit be validated at a given instant, there is no conflict concerning the use of the bus during the operation of the testing device.

The validation in progress is displayed by the corresponding one of the light-emitting diodes LED-VALD.

Figure 4:
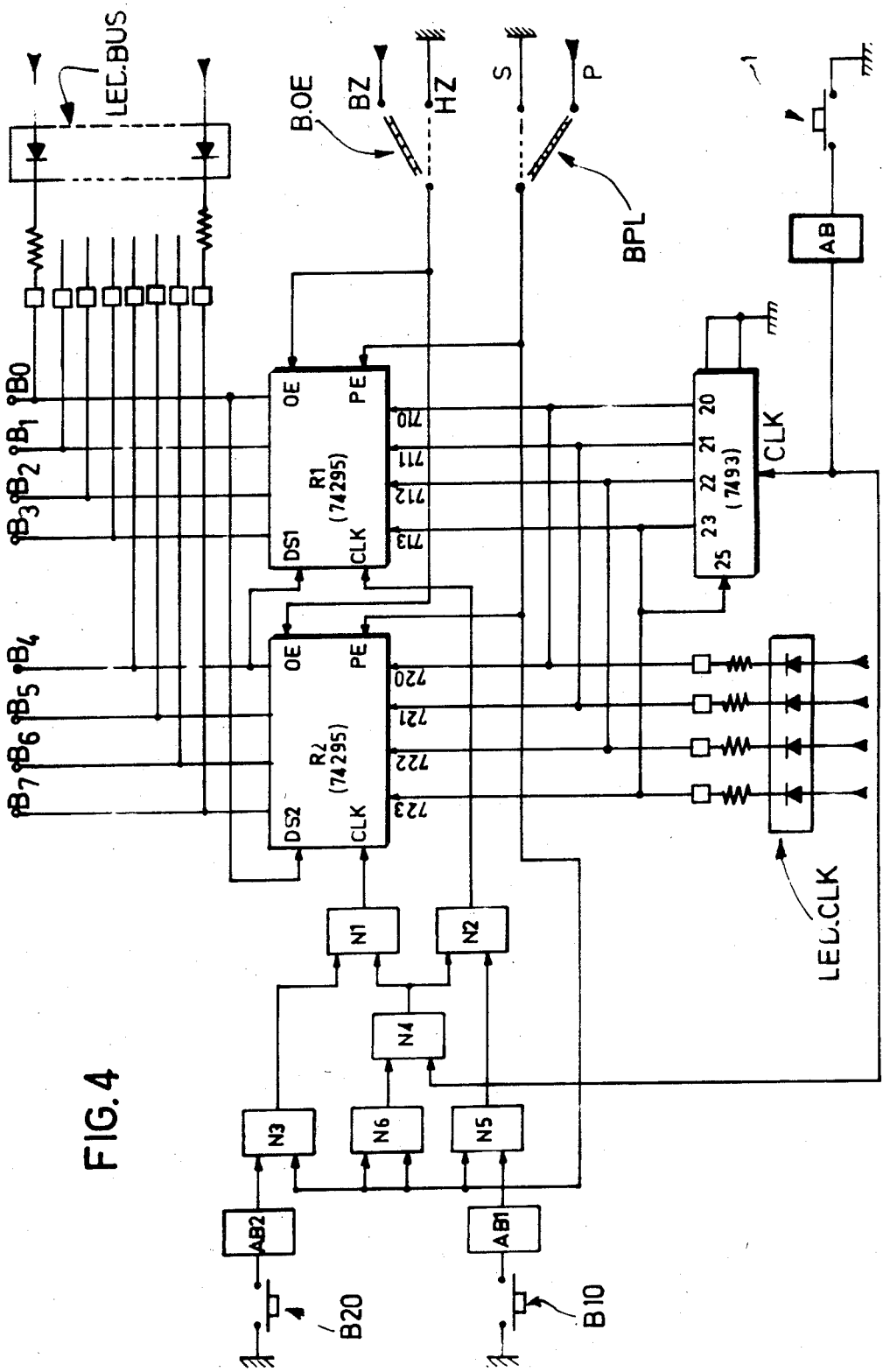
FIG. 4 shows a part of the electrical diagram of the testing device.

FIG. 4 shows extensively the section GEN-B of FIG. 3.

Each actuation of the push-button 1 generates, via an anti-jitter device (AB), a pulse which is applied to a 4-bit counter (Signetics 7493) and to a NAND-gate (N4).

The 4-bit counter is coupled end-around (connections 23, 25) so that the binary values at the outputs 20 through 23 upon actuation of push-button 1 cycle from 0 through 15 with increments of 1. The data on outputs 20 through 23 is displayed on four light-emitting diodes (LED-CLK) and are fed to the inputs 710 to 713 and 720 to 723 of two series/parallel tri-state registers R1 and R2 (Signetics 74925). The series/parallel validation commands (PE) or "mode control" signals of the two registers R1, R2 are controlled by a switch (BPL). A high control signal value accomplishes parallel loading. A low control signal value allows for serial shifting.

The tri-state commands (OE) or "output enable" signals of the two registers R1, R2 are controlled by a switch (B.OE). A high control signal value makes the data content available for driving further elements in parallel operation at a low output impedance. A low control signal value terminates the parallel register outputs at a high impedance (HZ).

The outputs of the two registers (B0 to B3 and B4 to B7) are connected to the multiplexed bus of the circuit to be tested via the cable CDS of FIG. 2; DS2 being the serial inputs of those registers.

The eight light-emitting diodes LED-BUS display the data circulating on the bus, independent of the origin of those data.

The 8 light-emitting diodes LED-BUS display the binary output signals of said two series/parallel registers as well as the binary signals arriving via said multiplexed bus.

The control button BPL is also connected to an input of each of the NAND-gates N3 and N5, and to two inputs of NAND-gate N6.

The output of the gate N6 is connected to an input of the NAND-gate 14.

The inverter switch B20 is connected to an input of the gate N3 via an anti-bouncing device AB2.

The inverter switch B10 is connected to an input of the gate N5 via an anit-bouncing device AB1.

The output of N4 is connected to an input of each NAND-gate N1 and N2.

The output of N3 is connected to an input of the gate N1.

The output of N5 is connected to an input of the gate N2.

The output of N1 is connected to the input CLK of the register R2.

The output of N2 is connected to the input CLK of the register R1.

DESCRIPTION OF THE METHOD STEPS

In a preliminary stage the power supply of the microprocessor system and the correct generation of clock pulses are tested in known manner. Next, the microprocessor of the system to be tested is replaced by another microprocessor of the same type. If the microprocessor system is still non-operative, the testing device of FIGS. 2–4 is brought into action by the following steps:
- removal of the microprocessor 8048;
- connection of the cable CDS connector instead of the microprocessor;
- connection of the cable/connector CDP to the pads of the ROM;
- setting all peripheral integrated circuits to a high impedance by way of the push-button (BP) and visual verification of the light-emitting diodes LED-VALD which should all extinguish.

GENERATION OF A SIGNAL "0000 001" ON THE BUS switch BOE in its active position, validation of the two registers R1 and R2;

switch BPL in the position +, which means parallel operation of the two registers R1 and R2;

setting the 4 light-emitting diodes LED-CLK to zero ('0000') by activation of the push-button 1;

providing a clock pulse to R2 by depression of the button B20. The preceding manipulations by means of gates N1, N3, N4 and N6 control the signals on inputs 720 through 723 upon actuation of push-button B20 to appear on outputs B4 through B7: initially, this is HEX0 (0000);

setting the light-emitting diodes LED-CLK to Hex1 ('0001') by depressing the button 1 once;

clock pulse to R1 by depression of the button B10. The value HEX1, is now present on outputs B0 to B3.

The outputs B0 to B7 are thus all '0', except for the least-significant output B0; this can be verified visually by way of the light-emitting diodes LED-BUS.

If the bus operates correctly, also all eight light-emitting diodes LED-CDP-D of FIG. 2 are at zero, exept for the least-significant one.

For testing the individual lines of the bus the following operations are performed:

switch BPL connecting to ground, for correctly conditioning gates N3, N5, N6 and serializing the registers R1, R2;

upon each actuation of the button 1, via the gates N4, N1 and N2, a clock pulse is simultaneously applied to registers R1, R2, for shifting the single binary "1", initially present on output B0, successively through the outputs B1 through B7. The actual input state of the ROM is each time signalled by the light-emitting diodes LED-CDP-D.

If an interruption on short-circuit is present in the bus, an error correction is signalled by the simultaneous lighting of two or more LED's or by the extinguishing of all LED's. This situation would identify the cause of an error: notably this could be a short-circuit with the power supply. In similar way a transposed initial pattern may be used that has a different single "1" bit position.

GENERATION OF A SIGNAL '1111 1110' ON THE BUS

Next, the bus is initialized to the value HEX FE (1111 1110—all lines except one at binary "1"). Now upon repeated actuation of the push-button 1, it is the single zero that is successively shifted through all bit positions on the bus. Again the single non-concurrent LED—now extinguished—among the diodes LED-CDP.D is a sign of correct operation. Any other pattern signals a fault, notably a short-circuit with round, although certain other fault patterns would also be signalled, such as interruptions.

The memory RAM and other peripheral circuits may likewise be tested by repeating the above described steps with the test connector (CDP) connected to those further circuits. Now, at this stage the general bus (BUSMUX) has been tested; if however, the cause of the malfunctioning has not been identified, next the address bus (ADBUS) and associated latch (ADLATCH) must be tested.

Keeping the test probe of the test connector (CDP) connected to the ROM as previously, the test procedure for the address bus fed via the latch is quasi-identical to the testing of the data bus, except that the visual check of the address return is performed by way of the 8 licht-emitting diodes LED-CDP-A. Furthermore, between each successive actuation of the push-button 1 for shifting the 1 or the 0 as described above, it is necessary to validate the latch by operation of the button B.ALE (Address Latch Enable) to load the address bus. Notably, with a multiplexed bus, an address transfer involves a transfer on the multiplexed bus and therefore, a check of the databus may form part of the check prosedure of the address bus.

If at this point the cause of the malfunctioning of the microprocessor system has not been identified, the peripheral circuits must be tested one by one for correct operation.

The test connector (CDP) is again connected to the ROM. The ROM contains a program to be executed by the microprocessor which is activated by the command PSEN (Program Storage Enable). Because the program is known, the verification consists of reading known memory words at known addresses, and verifying the information content (always visually and static) that is present on the return bus (ADBUS).

The most complete test consists of the selection in advance of certain ROM words whose contents are 0, $2^0, 2^1, 2^2 \ldots 2^n, 2^{n+1}-1$, respectively, n being an integer number equal to the number of bits of each word i.e. the number of lines of the data bus.

The addresses of these selected words, $A_{00}, A_0, A_1, \ldots A_n, A_{n+1}$ are thus generated (indicated by the light-emitting diodes LED-BUS) by initializing the bus in the described manner; the addresses are validated by means of the button B-ALE, the content of each address in the ROM being read by means of the button B-PSEN. The result of the write operation (present on the bus) can be tested by way of the light-emitting diodes LED-BUS. After validation of the address $A_i$, it can be verified, (by means of the light-emitting diodes LED-CDP-A) that the correct address has indeed been validated on the address bus.

If at this point the defect has not yet been identified, it is necessary to test any of the peripheral integrated circuits by means of a corresponding method. By way of example, the test procedure for the memory RAM will be described in the following steps:

validation of the memory RAM by means of push-button B.Pxx and box VALD, disjunct with any other validation;

setting the switch B.OE to position BZ, whereby signal OE connects registers R1, R2 to their respective outputs B0 through B7 at a low impedance level;

generating on the data bus an arbitrary address $A_i$ to access the random access memory;

validation of this address $A_j$ on the address bus of the latch by means of the button B-ALE;

generating on the data bus an arbitrary data Dq in the described manner;

writing this data in the random access memory RAM by means of the button B-WR;

setting switch BOE to position HZ in order to allow for parallel loading of registers R1, R2;

under control of push-button B.RD reading the contents of unchanged address $A_j$ still present on the address bus;

verification, by means of the light-emitting diodes LED-CDP-D and the light-emitting diodes LED-BUS, that the same data Dq that had been written was read again;

optional repeat of all these operations for other addresses and other data.

As evident from the foregoing both the device as explained and the test-step sequence have a simple setup for allowing fast operation in an inexpensive device.

A particular advantageous feature is the use of a four-bit counter for loading the data bus with arbitrary values between HEX00 and HEXFF by means of at most eight actuation cycles of clock push-button 1. The verification of the loading may be done quite expediently by verifying the four-bit content of counter 7493, which has a value range from HEX0 to HEXF.

If the bus width is increased from 8 bit to 4n (n=3, 4 ...) bits, an additional register R1, R2 could be included for correct and efficient of loading the bus.

Moreover, it has been found that the method and the device for the static testing of the connections and the peripheral integrated circuits of a microprocessor is an excellent didactical tool for training and for explaining to electronic engineers and others the operation of each integrated component in a microcomputer.

What is claimed is:

1. A method for testing a microprocessor-based system in case of a malfunction in said system, said system having a data bus with a first plurality of bit lines in parallel, an address bus with a second plurality of bit lines in parallel, and a third plurality of control bit lines for interconnecting said microprocessor with respective peripheral circuits (ROM, RAM) thereof, said method comprising the steps of:

(a) verifying whether a significant general power supply level for said system is present;

(b) verifying the presence of a correct clock signal for said system as provided by a clock signal procurement means;

(c) replacing the system microprocessor by another, non-defective, microprocessor of the same type to determine whether the original system microprocessor is defective; and in case of a sufficient general supply level and a correct clock signal and the presence of said non-defective microprocessor, said system is still malfunctioning, the following steps are executed:

(d) removing the non-defective microprocessor while steering all said peripheral circuits to their high-impedance output states with respect to respective ones of said first, second, and third pluralities of bit lines connected to said peripheral circuits;

(e) feeding said first, second and third pluralities of bit lines with a sequence of quasi-static signal patterns for implementing the following steps for testing a predetermined peripheral circuit interconnection;

(f) applying a sequence of binary signals to each bit line associated to said peripheral circuit and verifying the presence of said binary signal on the corresponding package input of said peripheral circuit;

(g) verifying of the absence of short circuits between the various bit lines and/or between a line and the power supply by applying a binary signal of high level via a single bus line and a binary signal of low level via all other bus lines, and verifying that said binary signal of high level does not arrive on a bus line other than the line on which it has been dispatched, followed by the successive application of said binary high signal via all other bus lines in order to perform the same verification as before by simple permutation of signal values;

(h) verifying of the absence of short circuits between the various bus lines and/or between a line and ground by dispatching a binary signal of low level (connected to ground) via a single bus line and a binary signal of high level via all other bus lines, and verifying that said other than the line on which it has been dispatched, followed by the successive application of said binary signal of low level on all other bus lines in order to perform the same verification as before by simple permutation of signal values.

2. A method as claimed in claim 1, one of the peripheral integrated circuits being a read only memory ROM whose content is known and which contains the address locations $A_{00}, A_0, A_1, A_2, \ldots, A_n, A_{n+1}$ at which data are written whose respective values are $0, 2^0, 2^1, 2^2, \ldots, 2^n, 2^{n+1}-1$, respectively, n being an integer number which is at most equal to the number of lines of the data bus, said method comprising the following additional steps:

(i) activating setting to a low impedance) of the read only memory ROM;

(j) activating, with display, of the address $A_{00}$;

(k) reading of the content of $A_{00}$;

(l) verifying, by display, that the result of the read operation (k) is indeed zero (0);

(m) repeating successively the three preceding operations j, k, l, with the addresses $A_0, A_1, \ldots$ until $A_{n+1}$ and verification that the result of the various read operations is indeed $1, 2 \ldots 2^n, 2^{n+1}-1$, respectively.

3. A method as claimed in claim 1 or 2, one of the peripheral integrated circuits being a random access memory (RAM), characterized in that it comprises the following steps:

(n) activating (setting to a low impedance) of the random access memory RAM.

(o) generating and validating of an address on the address bus;

(p) generating of a data on the data bus;

(q) writing of this data in the random access memory RAM;

(r) reading in the RAM and verifying on the data bus that the data previously written during the stage (q) has indeed been read;

(s) repeat, of the operations (o) to (r) for at least one other address and at least one other data.

4. A device for the static testing of the connections of the peripheral integrated circuits to a microprocessor ($\mu P$) in a microprocessor-based system, said system having a data bus (BUSMUX) with a first plurality of bit lines in parallel, an address bus (ADBUS) with a second plurality of bit lines in parallel, and a third plurality of control lines (ALE, RD, WR) for interconnecting said microprocessor with respective peripheral circuits thereof, characterized in that said device comprises:

attachment means (CDS) for attaching said device to the system in lieu of the microprocessor;

validation means for manually validating (setting to a low impedance a first peripheral circuit while setting to a high impedance output state any other peripheral circuit;

pad connection means (CDR), for connecting said device, during the validation of said first peripheral integrated circuit, to the pads of said peripheral integrated circuit, generating means for statically generating binary signals to emulate the microprocessor on said first, second and third pluralities of bit lines;

first displaying means (LEDBUS) for statically displaying said binary signals as generated on at least a multiple-element subset of said first, second and third pluralities of bit lines;

second displaying means (LEDCPD) for the static display of the binary signals effectively appearing on the pads of said first peripheral integrated circuit;

third displaying means (LEDVALD) for the static display of the binary signals originating from outputs of said first peripheral integrated circuit and received by the device in lieu of the microprocessor.

5. A device as claimed in claim 4, characterized in that said third displaying means comprise: a pulse generator device comprising an output anti-bouncing circuit for the manually-controlled forming of a clock pulse, a counter (7493) having a fourth plurality of n bit stages, an n-bit display element (LEDCLK) for the contents of said n bit stages in parallel, two n-bit series-/parallel registers (R1, R2) connected in parallel, and manually activatable control means for loading each of the two n-bits registers with the appropriate values previously obtained by means of a series of said clock pulses fed to said n-bit counter.

6. A device as claimed in claim 5, characterized in that it has serializing control means (BPL) for arranging said two n-bit registers in series to act as a shift register for a 2n-bit shiftable test pattern.

* * * * *